(12) United States Patent
Harris et al.

(10) Patent No.: US 7,807,311 B2
(45) Date of Patent: Oct. 5, 2010

(54) APPARATUS FOR HYDROGEN-AIR MIXING IN A FUEL CELL ASSEMBLY AND METHOD

(75) Inventors: Daniel L. Harris, Honeoye Falls, NY (US); Glenn W. Skala, Churchville, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 238 days.

(21) Appl. No.: 11/549,753

(22) Filed: Oct. 16, 2006

(65) Prior Publication Data

US 2008/0187786 A1 Aug. 7, 2008

(51) Int. Cl.
*H01M 8/02* (2006.01)

(52) U.S. Cl. .................. 429/457; 429/52; 429/419; 429/429

(58) Field of Classification Search ............. 429/24, 429/26, 35, 32, 17, 22, 13, 22.4, 41, 52
See application file for complete search history.

(56) References Cited

U.S. PATENT DOCUMENTS

| | | | | |
|---|---|---|---|---|
| 6,103,410 A | * | 8/2000 | Fuller et al. | 429/13 |
| 6,127,056 A | * | 10/2000 | Wheeler et al. | 429/13 |
| 6,156,447 A | * | 12/2000 | Bette et al. | 429/13 |
| 6,232,005 B1 | * | 5/2001 | Pettit | 429/19 |
| 6,232,085 B1 | * | 5/2001 | Pantoliano et al. | 435/7.1 |
| 6,358,638 B1 | * | 3/2002 | Rock et al. | 429/13 |
| 6,635,378 B1 | * | 10/2003 | Yang et al. | 429/34 |
| 6,821,658 B2 | * | 11/2004 | Acker et al. | 429/13 |
| 6,979,506 B2 | * | 12/2005 | Ballantine et al. | 429/22 |
| 2002/0110723 A1 | * | 8/2002 | Farkash | 429/39 |
| 2003/0129462 A1 | * | 7/2003 | Yang et al. | 429/17 |
| 2004/0009377 A1 | * | 1/2004 | Iguchi | 429/13 |
| 2004/0067408 A1 | * | 4/2004 | Horiuchi et al. | 429/40 |
| 2004/0151955 A1 | * | 8/2004 | Keskula et al. | 429/13 |
| 2004/0197623 A1 | * | 10/2004 | Champion et al. | 429/24 |
| 2005/0181260 A1 | * | 8/2005 | Cai et al. | 429/35 |
| 2007/0190379 A1 | * | 8/2007 | Song et al. | 429/24 |
| 2007/0213545 A1 | * | 9/2007 | Bolk et al. | 549/536 |

FOREIGN PATENT DOCUMENTS

WO WO2006071223 * 6/2006

OTHER PUBLICATIONS

Deflagration & Detonation Arrestors, Staney S. Grossel, Process Safety & Designs Inc., Section 5.3.4.—Quenching Diameter, Quenching Length and Flame Velocity, pp. 105-113.*

* cited by examiner

*Primary Examiner*—Dah-Wei D Yuan
*Assistant Examiner*—Amanda Barrow
(74) *Attorney, Agent, or Firm*—Fraser Clemens Martin & Miller LLC; J. Douglas Miller

(57) ABSTRACT

A fuel cell assembly and method is disclosed for the mixing and heating of hydrogen and air in the fuel cell assembly and introducing the heated hydrogen and air to the fuel cell assembly during a starting operation to heat the fuel cell assembly to militate against vapor condensation and ice formation in the fuel cell assembly.

20 Claims, 4 Drawing Sheets

APPARATUS FOR HYDROGEN-AIR MIXING IN A FUEL CELL ASSEMBLY AND METHOD

FIELD OF THE INVENTION

The invention relates to an apparatus and method for heating a fuel cell assembly, and more specifically to an apparatus and method of mixing and heating hydrogen and air in the fuel cell assembly to facilitate catalytic combustion inside the fuel cell assembly during a starting operation to rapidly heat the fuel cell assembly and to militate against vapor condensation and ice formation in the fuel cell assembly.

BACKGROUND OF THE INVENTION

Fuel cell assemblies convert a fuel and an oxidant to electricity. One type of fuel cell power system employs use of a proton exchange membrane (hereinafter "PEM") to catalytically facilitate reaction of fuels (such as hydrogen) and oxidants (such as air or oxygen) to generate electricity. The PEM is a solid polymer electrolyte membrane that facilitates transfer of protons from an anode to a cathode in each individual fuel cell normally deployed in a fuel cell power system.

In a typical fuel cell assembly (stack) within a fuel cell power system, individual fuel cell plates include channels through which various reactants and cooling fluids flow. Fuel cell plates are typically designed with serpentine flow channels. Serpentine flow channels are desirable as they effectively distribute reactants over the active area of an operating fuel cell, thereby maximizing performance and stability. In subzero temperatures, water vapor in the fuel cell assembly may condense. Further, the condensate may form ice in the fuel cell assembly. The presence of condensate and ice may affect the performance of the fuel cell assembly and may also cause damage to the fuel cell assembly.

During typical operation of the fuel cell assembly in subzero temperatures, waste heat from the fuel cell reaction heats the assembly and militates against vapor condensation and ice formation in the assembly. However during a starting operation or low power operation of the fuel cell assembly in subzero temperatures, water vapor may condense and the condensate may form ice within the fuel cell assembly.

It would be desirable to develop an apparatus and method for quickly and efficiently heating the fuel cell assembly during the starting operation to militate against vapor condensation and ice formation in the fuel cell assembly.

SUMMARY OF THE INVENTION

Concordant and congruous with the present invention, an apparatus and method for quickly and efficiently heating the fuel cell assembly during the starting operation to facilitate catalytic combustion inside the fuel cell assembly during a starting operation to rapidly heat the fuel cell assembly and to militate against vapor condensation and ice formation in the fuel cell assembly has surprisingly been discovered.

In one embodiment, a fuel cell assembly comprises a fuel cell stack including a plurality of fuel cell plates, wherein each plate includes a plurality of flow channels, a mixing region in fluid communication with the flow channels, at least two apertures formed therein, the apertures of the fuel cell plates substantially aligned to form a first manifold in fluid communication with the mixing region and a second manifold in fluid communication with the mixing region, wherein a first fluid flowing through the first manifold is mixed with the second fluid flowing through the second manifold in the mixing region; and a means for heating a first fluid and a second fluid, wherein the heated fluids are caused to flow through the flow channels to heat said fuel cell stack to militate against vapor condensation and ice formation in said fuel cell stack.

The invention also provides a method of mixing hydrogen and air in a fuel cell assembly that comprises the steps of providing a fuel cell stack including a plurality of fuel cell plates, wherein each plate includes plurality of flow channels, a mixing region in fluid communication with the flow channels, at least two apertures formed therein, the apertures of the fuel cell plates substantially aligned to form a first manifold and a second manifold in fluid communication with the mixing region; providing a means for heating the first fluid and the second fluid; causing the first fluid to flow through the first manifold to the mixing region; causing the second fluid to flow through the second manifold to the mixing region; causing a heating of the first fluid and the second fluid with the means for heating; mixing the first fluid and the second fluid in the mixing region; and causing the heated fluids to flow through the flow channels, for removal of liquid water and ice from the fuel cell assembly.

The invention also provides another method of mixing hydrogen and air in a fuel cell assembly that comprises the steps of providing a fuel cell stack including a plurality of fuel cell plates, wherein each plate includes a plurality of flow channels, a mixing region in fluid communication with the flow channels, at least two apertures formed therein, the apertures of the fuel cell plates substantially aligned to form a first manifold and a second manifold in fluid communication with the mixing region; providing a catalyzed surface in the fuel cell stack; causing the first fluid to flow through the first manifold to the mixing region; causing the second fluid to flow through the second manifold to the mixing region; causing the fluids to flow through the flow channels to heat the fuel cell stack to militate against vapor condensation and ice formation in the fuel cell stack during a starting operation of the fuel cell stack.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
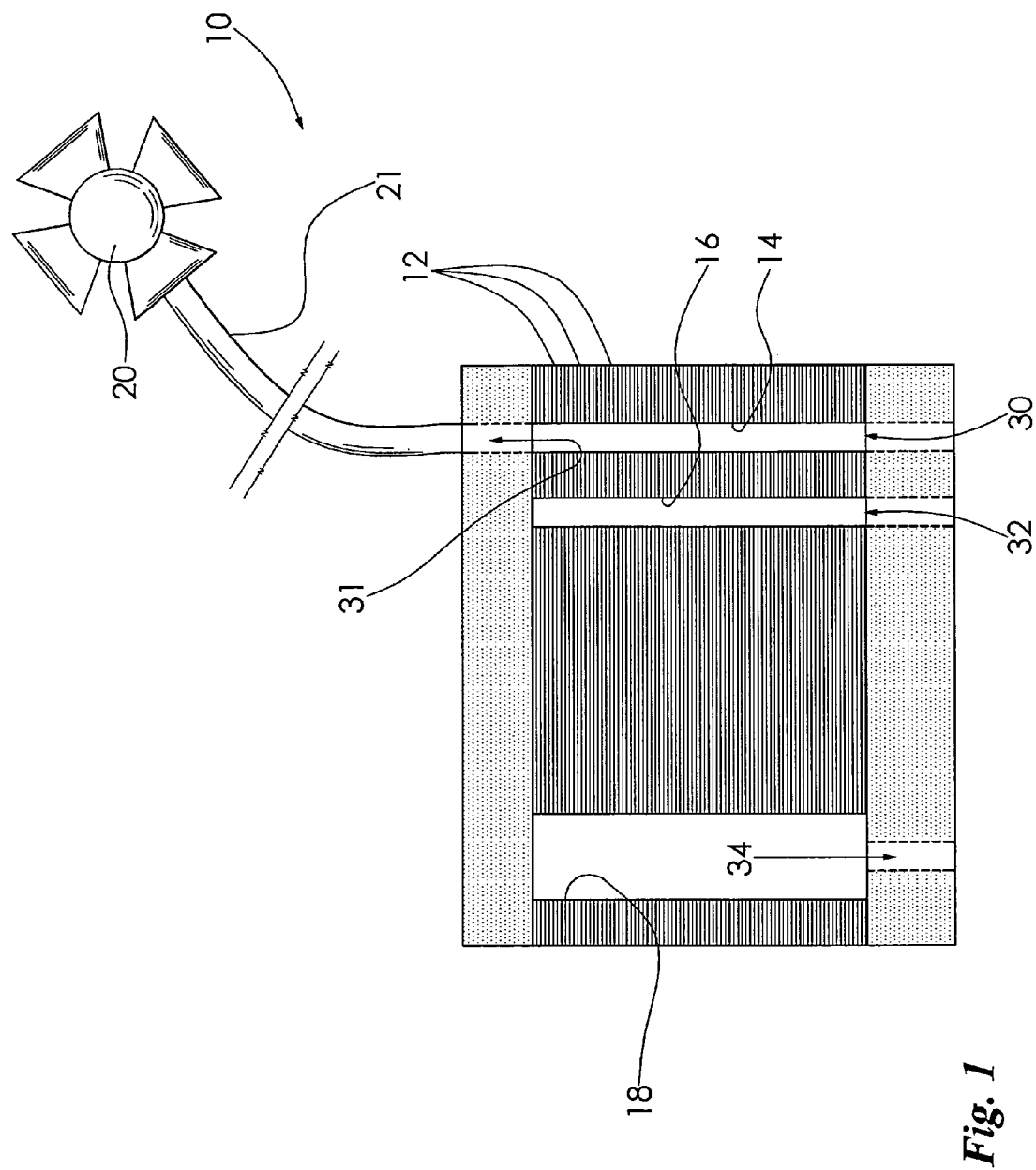
FIG. 1 is a cross-sectional elevational view of a fuel cell stack incorporating a plurality of fuel cell plates according to an embodiment of the invention.

FIG. 1 shows a fuel cell assembly 10 according to an embodiment of the invention. The fuel cell assembly 10 includes a plurality of fuel cell plates 12. A first inlet manifold 14, a second inlet manifold 16, and an outlet manifold 18 are formed in the fuel cell assembly 10. A valve 20 is in fluid communication with the first inlet manifold 14.

Figure 2:
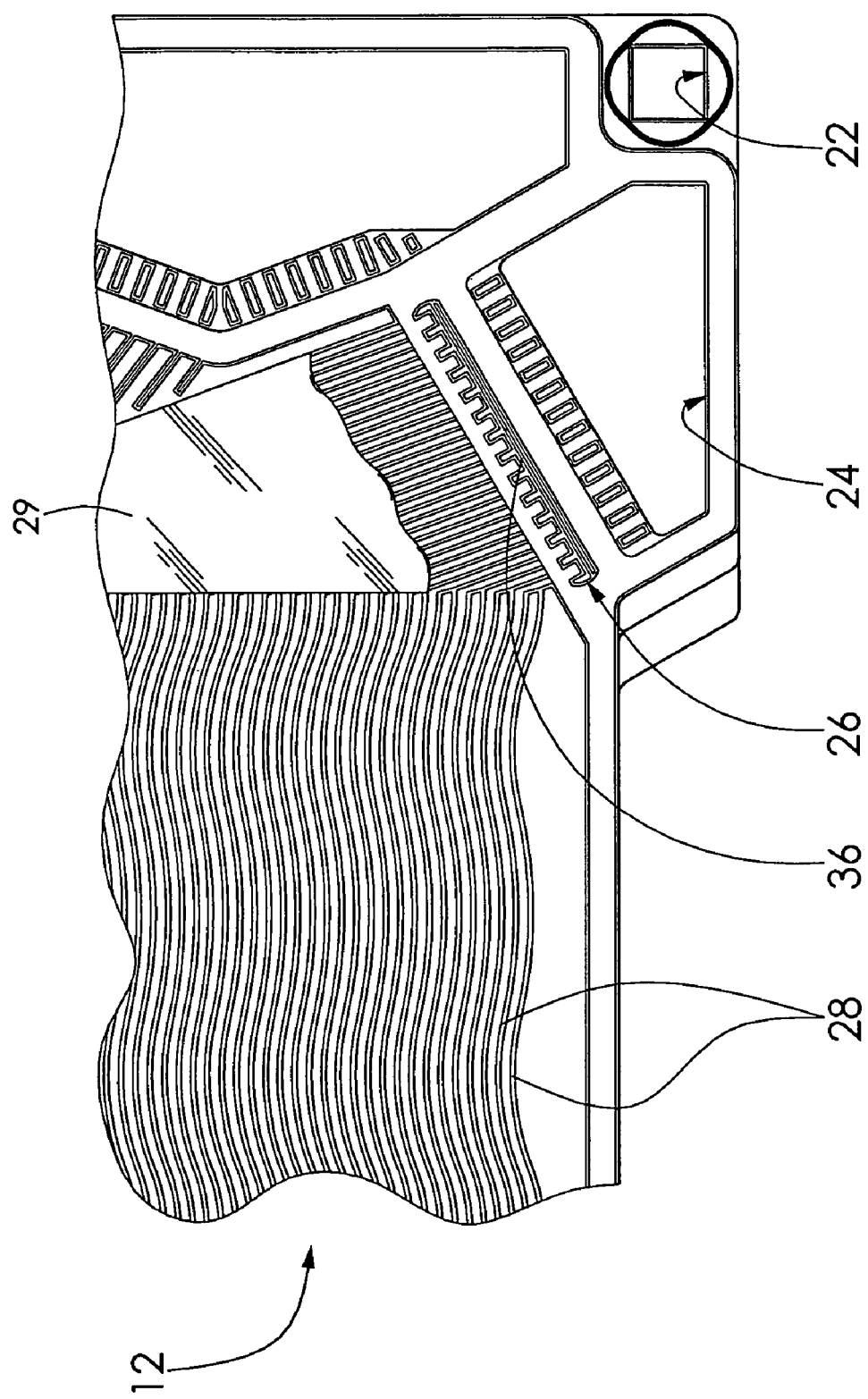
FIG. 2 is a fragmentary top plan view of one of the fuel cell plates illustrated in FIG. 1.

FIG. 2 shows a cathode side of one of the fuel cell plates 12. The fuel cell plate 12 includes a first inlet aperture 22, a second inlet aperture 24, an outlet aperture (not shown), a mixing region 26, and a plurality of flow channels 28. The first inlet aperture 22 and the second inlet aperture 24 of the fuel cell plates 12 cooperate to respectively form the first inlet manifold 14 and the second inlet manifold 16 of the fuel cell assembly 10. It is understood that the material of construction, size, shape, quantity, and type of plates 12 in the fuel cell assembly 10, and the configuration of the fuel cell plates 12 within the fuel cell assembly 10, may vary based on design parameters such as the amount of electricity to be generated, the size of the machine to be powered by the fuel cell assembly 10, the volumetric flow rate of gases through the fuel cell assembly 10, and other similar factors, for example. It is also understood that the plate 12 shown in FIG. 2 may be used for an anode side (not shown) or for a cathode side of the fuel cell assembly 10. Further, it is understood that the plate 12 may have any number of inlet apertures 22, 24 and outlet apertures, as desired.

The mixing region 26 of each of the fuel cell plates 12 is disposed adjacent the first inlet aperture 22 and the second inlet aperture 24, and between the apertures 22, 24 and the flow channels 28. The mixing region 26 may have a catalyst coating applied thereto and providing a catalyzed surface 36. The catalyst may be any conventional catalyst such as a platinum based, a palladium based, and a cerium based catalyst, for example. It is understood that the catalyzed surface 36 may be any surface of the fuel cell assembly 10, such as the surface of the fuel cell plates 12, the flow channels 28, a metal shim 29 with a catalyst coating, and mixed with a diffusion media, as desired. In the embodiment shown, the flow channels 28 are undulated. However, it is understood that the flow channels 28 may be substantially linear, serpentine, or other configurations, as desired.

The first inlet manifold 14 includes an inlet 30 and an outlet 31. The first inlet manifold 14 is formed in the fuel cell assembly 10 by the first inlet apertures 22 of the fuel cell plates 12. The plates 12 are stacked with the first inlet aperture 22 of each plate 12 substantially aligned with the first inlet aperture 22 of an adjacent plate or plates 12. It is understood that the diameter, quantity, and length of the first inlet manifold 14 will depend on the size and quantity of the first inlet apertures 22 in the plates 12 and the number of plates 12 stacked in the fuel cell assembly 10. It is also understood that the first inlet manifold 14 may have a geometry that militates against flame propagation through the first inlet manifold 14. It is further understood that the first inlet manifold 14 may include a flame arresting material such as a fiberglass, a ceramic, and any other treated fiber, for example.

The second inlet manifold 16 includes an inlet 32. The second inlet manifold 16 is formed in the fuel cell assembly 10 by the second inlet apertures 24 of the fuel cell plates 12. The plates 12 are stacked with the second inlet aperture 24 of each plate 12 substantially aligned with the second inlet aperture 24 of an adjacent plate or plates 12. It is understood that the diameter, quantity, and length of the second inlet manifold 16 will depend on the size and quantity of the second inlet apertures 24 in the plates 12 and the number of plates 12 stacked in the fuel cell assembly 10. It is also understood that the second inlet manifold 16 may include a flame arresting material such as a fiberglass, a ceramic, and any other treated fiber, for example.

The outlet manifold 18 includes an outlet 34. The outlet manifold 18 is formed in the fuel cell assembly 10 by the outlet apertures of the fuel cell plates 12. The plates 12 are stacked with the outlet aperture of each plate 12 substantially aligned with the outlet aperture of an adjacent plate or plates 12. It is understood that the diameter, quantity, and length of the outlet manifold 18 will depend on the size and quantity of outlet apertures in the plates 12 and the number of plates 12 stacked together in the fuel cell assembly 10. It is also understood that the outlet manifold 18 may include a flame arresting material such as a fiberglass, a ceramic, and any other treated fiber, for example.

In the embodiment shown, the valve 20 is a four-way valve in fluid communication with the outlet 31 of the first inlet manifold 14. The valve 20 is further in fluid communication with a fuel tank (not shown). The valve 20 is adapted to provide selective communication between the fuel cell assembly 10 and the fuel tank. The valve 20 is connected to the fuel cell assembly 10 and the fuel tank by a conduit 21, however, it is understood that the valve 20 may be directly connected to the fuel cell assembly 10, if desired. It is also understood that the valve 20 may be any conventional means for regulating flow such as a one-way valve, a two-way valve, a three-way valve, a globe valve, a gate valve, and a pump, for example. It is further understood that the valve 20 may be in fluid communication with any vessel or system such as the fuel tank, an exhaust system (not shown), and ambient air, for example.

Generally, during operation of a fuel cell power system, a stream of hydrogen is fed into the anode side of the fuel cell assembly 10. Concurrently, a stream of oxygen is fed into the cathode side of the fuel cell assembly 10. On the anode side, the hydrogen in the hydrogen stream is catalytically split into protons and electrons. The oxidation half-cell reaction is represented by: $H_2 \leftrightharpoons 2H^+ + 2e^-$. In a polymer electrolyte membrane fuel cell, the protons permeate through the membrane to the cathode side. The electrons travel along an external load circuit to the cathode side creating the current of electricity of the fuel cell assembly 10. On the cathode side, the oxygen in the oxidant stream reacts with the protons permeating through the membrane and the electrons from the external circuit to form water molecules. This reduction half-cell reaction is represented by: $4H^+ + 4e^- + O_2 \leftrightharpoons 2H_2O$. Anode exhaust from the anode side typically flows through a backpressure control valve (not shown) to a combustor. However, it is understood a combustor may not be present, as desired.

Cathode exhaust from the cathode side flows through a second backpressure control valve (not shown) to the combustor. A control module (not shown) regulates the conditions of the hydrogen stream, oxygen stream, and exhaust streams by operating various control valves (not shown), backpressure control valves (not shown), and compressors (not shown) in response to signals from pressure sensors (not shown) and electrical power sensors (not shown) connected to the fuel cell assembly 10.

During a starting of the fuel cell assembly 10, hydrogen is caused to flow through the first inlet manifold 14 of the cathode side of the fuel cell assembly 10, while air is also caused to flow through the second inlet manifold 16 to the cathode side of the fuel cell assembly 10. It is understood that the operation as described herein for the cathode side is similar to operation for the anode side of the fuel cell assembly 10. The hydrogen and air are caused to mix in the mixing region 26 of the fuel cell plate 12 where the catalyzed surface 36 causes a catalytic reaction to heat the gases. It is understood that the catalyzed surface 36 is a means for heating the gases and that the means for heating the gases could be any conventional heat source such as an electrical heat source, for example. The heated gases are then caused to flow through the flow channels 28 of the fuel cell plates 12 to rapidly heat the fuel cell plates 12 and fuel cell assembly 10. The plates 12 and assembly 10 are heated to a desired temperature to militate against the condensation of vapor in or subsequently introduced to the assembly 10 and to militate against the formation of ice in the assembly 10. The limited dimensions of the inlet manifolds 14, 16, the flow channels 28, and the mixing region 26 are adapted to militate against the combustion of the gases in the fuel cell assembly 10. The diameters of the inlet manifolds 14, 16 are smaller than the flame quench diameter of hydrogen and air, respectively, and the combustion of the gases in the flow channels 28 is limited by the extinction limits of the flow channels 28.

When the assembly 10 has been sufficiently heated and the catalytic reaction and heating of the gases is no longer required, the hydrogen feed is stopped and the accumulation of hydrogen in the fuel cell assembly 10 is purged to prevent combustion. In the embodiment shown, the valve 20 is opened and a pressure-changing element (not shown) causes the hydrogen in the first inlet manifold 14 to be purged through the outlet 31 prior to entering the fuel cell assembly 10. It is understood that the pressure-changing element may be one of a pump, a compressor, pressure stored in the assembly, and any other pressure changing element, as desired. It is understood that the first inlet manifold 14 may not have the outlet 31 in communication with the valve 20 and the hydrogen in the first inlet manifold 14 may be purged into the fuel cell assembly 10. It is further understood that the velocity of hydrogen from the first inlet manifold 14 through the valve 20 may exceed a maximum flame speed in the first inlet manifold 14 to further militate against combustion. After the fuel cell assembly 10 has been sufficiently heated and the first inlet manifold 14 has been sufficiently purged of hydrogen, the valve 20 may be closed to allow the hydrogen feed and the fuel cell assembly 10 may be operated at normal conditions.

An objective of the present invention is to mix and heat hydrogen and air in the fuel cell assembly 10 to facilitate catalytic combustion inside the fuel cell assembly 10 during a starting operation to rapidly heat the fuel cell assembly 10 and to militate against vapor condensation and ice formation in the fuel cell assembly 10.

Figure 3:
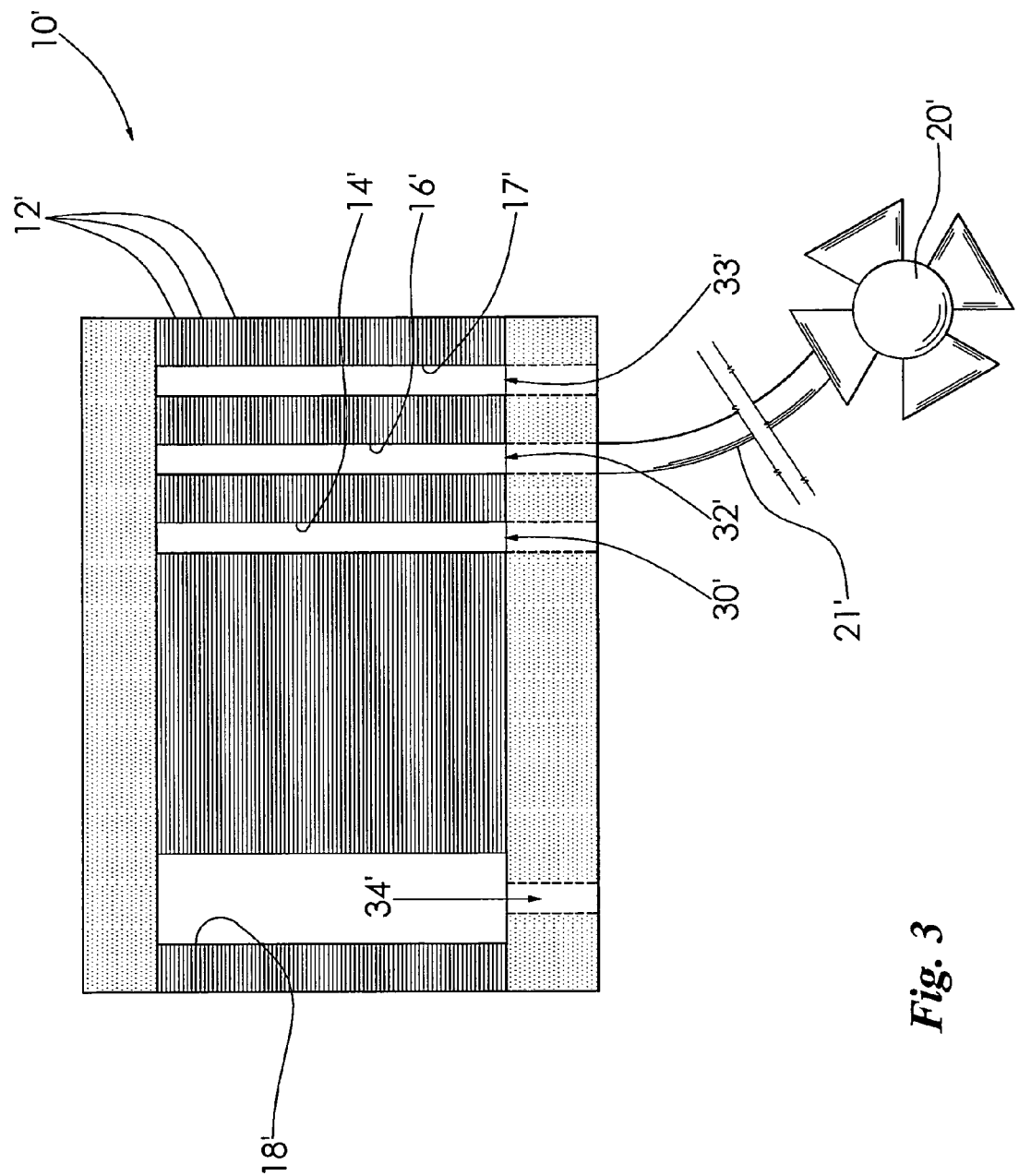
FIG. 3 is a cross-sectional elevational view of a fuel cell stack incorporating a plurality of fuel cell plates according to another embodiment of the invention.
Figure 4:
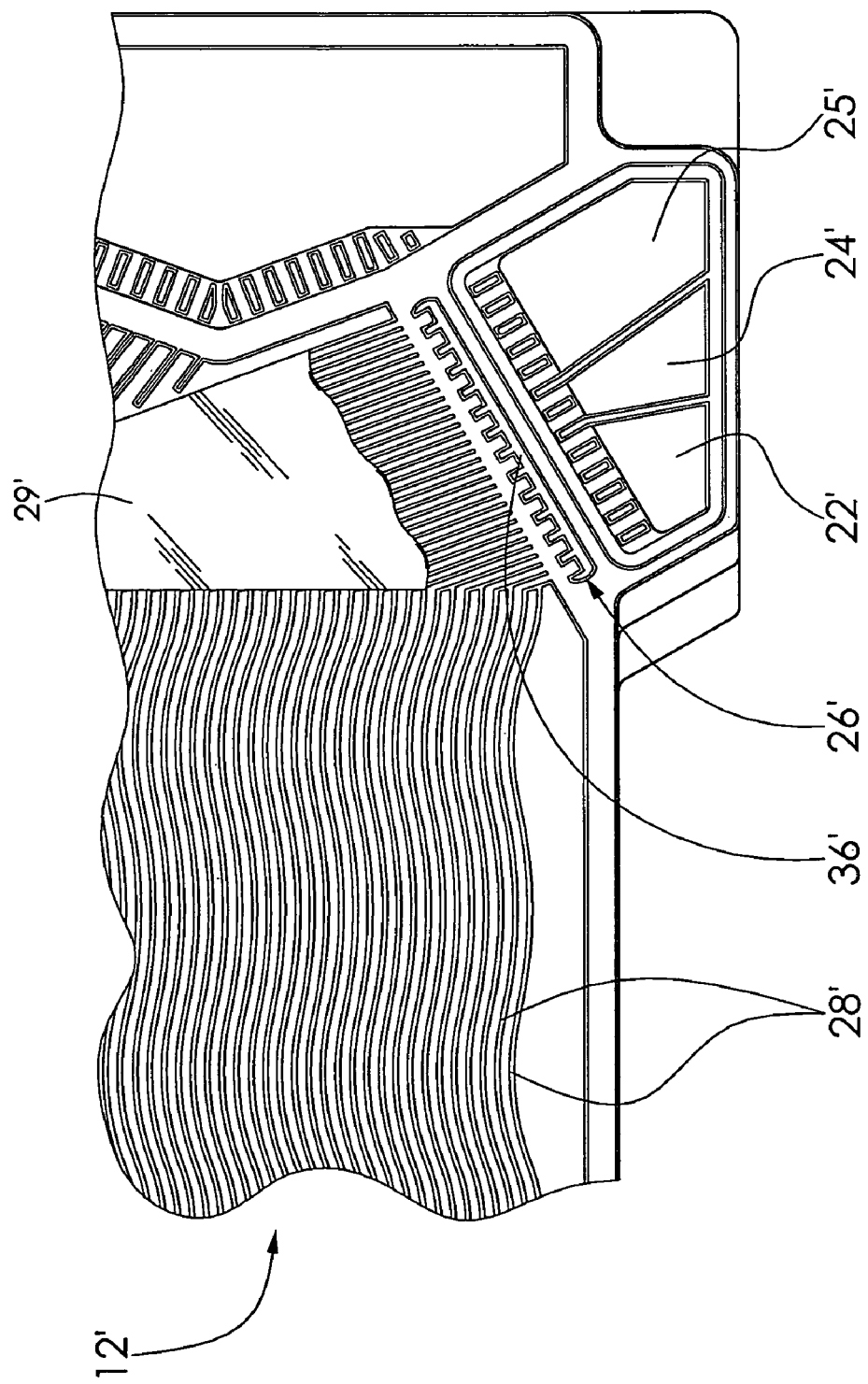
FIG. 4 is a fragmentary top plan view of one of the fuel cell plates illustrated in FIG. 3.

FIG. 3 shows a fuel cell assembly 10' according to another embodiment of the invention. The fuel cell assembly 10' includes a plurality of fuel cell plates 12'. A first inlet manifold 14', a second inlet manifold 16', a third inlet manifold 17', and an outlet manifold 18' are formed in the fuel cell assembly 10'. A valve 20' is in fluid communication with the first inlet manifold 14'. FIG. 4 shows one of the fuel cell plates 12'. The fuel cell plate 12' includes a first inlet aperture 22', a second inlet aperture 24', a third inlet aperture 25', an outlet aperture (not shown), a mixing region 26', and a plurality of flow channels 28'. The first inlet aperture 22', the second inlet aperture 24', and the third inlet aperture 25' of the fuel cell plates 12' cooperate to respectively form the first inlet manifold 14', the second inlet manifold 16', and the third inlet manifold 17' of the fuel cell assembly 10'. It is understood that the material of construction, size, shape, quantity, and type of plates 12' in the fuel cell assembly 10', and the configuration of the fuel cell plates 12' within the fuel cell assembly 10', may vary based on design parameters such as the amount of electricity to be generated, the size of the machine to be powered by the fuel cell assembly 10', the volumetric flow rate of gases through the fuel cell assembly 10', and other similar factors, for example. It is also understood that the plate 12' shown in FIG. 4 may be used for an anode side (not shown) or for a cathode side (not shown) of the fuel cell assembly 10'. Further, it is understood that the plate 12' may have any number of inlet apertures 22', 24', 25' and outlet apertures, as desired.

The mixing region 26' of each of the fuel cell plates 12' is disposed adjacent the first inlet aperture 22', the second inlet aperture 24', and the third inlet aperture 25' and between the inlet apertures 22', 24', 25' and the flow channels 28'. The mixing region 26' may have a catalyst coating applied thereto and providing a catalyzed surface 36'. The catalyst may be any conventional catalyst such as a platinum based, a palladium based, and a cerium based catalyst, for example. It is understood that the catalyzed surface 36' may be any surface of the fuel cell assembly 10', such as the surface of the fuel cell plates 12', the flow channels 28', a metal shim 29' with a catalyst coating, and mixed with a diffusion media, as desired. In the embodiment shown, the flow channels 28' are undulated. However, it is understood that the flow channels 28' may be substantially linear, serpentine, or other configurations, as desired.

The first inlet manifold 14' includes an inlet 30'. The first inlet manifold 14' is formed in the fuel cell assembly 10' by the first inlet apertures 22' of the fuel cell plates 12'. The first inlet manifold 14' is disposed immediately adjacent the second inlet manifold 16'. It is understood that the first inlet manifold 14' may be disposed anywhere on the fuel cell plate 12', as desired. The plates 12' are stacked with the first inlet aperture 22' of each plate 12' substantially aligned with the first inlet aperture 22' of an adjacent plate or plates 12'. It is further understood that the diameter, quantity, and length of the first inlet manifold 14' will depend on the size and quantity of the first inlet apertures 22' in the plates 12' and the number of plates 12' stacked in the fuel cell assembly 10'. It is understood that the first inlet manifold 14' may include a flame arresting material such as a fiberglass, a ceramic, and any other treated fiber, for example.

The second inlet manifold 16' includes an inlet 32'. The second inlet manifold 16' is formed in the fuel cell assembly 10' by the second inlet apertures 24' of the fuel cell plates 12'. The second inlet manifold 16' is disposed in between the first inlet manifold 14' and the third inlet manifold 17'. It is understood that the second inlet manifold 16' may be disposed anywhere on the fuel cell plate 12', as desired. The plates 12' are stacked with the second inlet aperture 24' of each plate 12' substantially aligned with the second inlet aperture 24' of an adjacent plate or plates 12'. It is understood that the diameter, quantity, and length of the second inlet manifold 16' will depend on the size and quantity of the second inlet apertures 24' in the plates 12' and the number of plates 12' stacked in the fuel cell assembly 10'. It is also understood that the second inlet manifold 16' may include a flame arresting material such as a fiberglass, a ceramic, and any other treated fiber, for example. It is further understood that the second inlet manifold 16' may include an outlet (not shown) and a second valve similar to the embodiment shown in FIG. 1.

The third inlet manifold 17' includes an inlet 33'. The third inlet manifold 17' is formed in the fuel cell assembly 10' by the third inlet apertures 25' of the fuel cell plates 12'. The third inlet manifold 17' is disposed immediately adjacent the second inlet manifold 16'. It is understood that the third inlet manifold 17' may be disposed anywhere on the fuel cell plate 12', as desired. The plates 12' are stacked with the third inlet aperture 25' of each plate 12' substantially aligned with the third inlet aperture 25' of an adjacent plate or plates 12'. It is understood that the diameter, quantity, and length of the third inlet manifold 17' will depend on the size and quantity of the third inlet apertures 25' in the plates 12' and the number of plates 12' stacked in the fuel cell assembly 10'. It is also understood that the third inlet manifold 17' may include a flame arresting material such as a fiberglass, a ceramic, and any other treated fiber, for example.

The outlet manifold 18' includes an outlet 34'. The outlet manifold 18' is formed in the fuel cell assembly 10' by the outlet apertures of the fuel cell plates 12'. The plates 12' are stacked with the outlet aperture of each plate 12' substantially aligned with the outlet aperture of an adjacent plate or plates 12'. It is understood that the diameter, quantity, and length of the outlet manifold 18' will depend on the size and quantity of outlet apertures in the plates 12' and the number of plates 12' stacked together in the fuel cell assembly 10'. It is also understood that the outlet manifold 18' may include a flame arresting material such as a fiberglass, a ceramic, and any other treated fiber, for example.

In the embodiment shown, the valve 20' is a four-way valve in fluid communication with the inlet 32' of the second inlet manifold 16'. The valve 20' is further in fluid communication with a fuel tank (not shown). The valve 20' is adapted to provide selective communication between the fuel cell assembly 10' and the fuel tank. The valve 20' is connected to the fuel cell assembly 10' with a conduit 21', however, it is understood that the valve 20' may be directly connected to the fuel cell assembly 10', if desired. It is further understood that the valve 20' may be any conventional means for regulating flow such as a one-way valve, a two-way valve, a three-way valve, a globe valve, a gate valve, and a pump, for example. It is further understood that the valve 20' may be in fluid communication with any vessel or system such as the fuel tank, an exhaust system (not shown), and ambient air, for example.

During a starting of the fuel cell assembly 10', hydrogen is caused to flow through the second inlet manifold 16' of the cathode side of the fuel cell assembly 10', while air is caused to flow through the first inlet manifold 14' and the third inlet manifold 17' to the cathode side of the fuel cell assembly 10'. It is understood that the first inlet manifold 14' and the third inlet manifold 17' may be individually in fluid communication with the source of air or the first inlet manifold 14', and second manifold 17' may be in fluid communication with each other and the source of air. It is understood that the operation as described herein for the cathode side is similar to operation for the anode side of the fuel cell assembly 10'. The hydrogen and air are caused to mix in the mixing region 26', of the fuel cell plate 12' where the catalyzed surface 36' causes a catalytic reaction to heat the gases. It is understood that the catalyzed surface 361 is a means for heating the gases and that the means for heating the gases could be any conventional heat source such as an electrical heat source, for example. The heated gases are then caused to flow through the flow channels 28' of the fuel cell plates 12' and rapidly heat the fuel cell plates 12, and assembly 10' to militate against the condensation of any vapor in or subsequently introduced to the assembly 10'.

When the assembly 10' has been sufficiently heated and the catalytic reaction and heating of the gases is no longer required, the hydrogen feed is stopped and the accumulation of hydrogen in the fuel cell assembly 10' is purged to prevent combustion. In the embodiment shown, the valve 20' is opened and a pressure-changing element (not shown) causes the hydrogen in the first inlet manifold 14' from the fuel cell assembly 10'. It is understood that the pressure-changing element may be one of a pump, a compressor, pressure stored in the assembly, and any other pressure changing element, as desired. The limited dimensions of the inlet manifolds 14', 16', 17', the flow channels 281, and the mixing region 26' are adapted to militate against the combustion of the gases in the fuel cell assembly 10'. The diameters of the inlet manifolds 14', 16' are smaller than the flame quench diameter of hydrogen and air, respectively, and the combustion of the gases in the flow channels 28' is limited by the extinction limits of the flow channels 28'.

To further militate against combustion of the gases, the valve 20' is engaged to switch the gas feed from a hydrogen feed to an purge gas feed. It is understood that the replacement of the hydrogen feed with the purge gas feed may be gradual or instantaneous, as desired. It is further understood that the purge gas may be any gas stream such as an oxygen depleted gas stream, an air stream, a hydrogen and nitrogen stream, and a pure hydrogen stream, for example. The oxygen-depleted gas feed purges the hydrogen from the second inlet manifold 16' and the fuel cell assembly 10' by causing the hydrogen to flow through the flow channels 28', the outlet manifold 18', and out of the fuel cell assembly 10'. It is understood that the velocity of the gases during the purge may exceed a maximum flame speed in the second inlet manifold 16' to further militate against combustion. After the fuel cell assembly 10' has been heated and the second inlet manifold 16' has been sufficiently purged of hydrogen, the valve 20' may be switched back to a hydrogen feed and the fuel cell assembly 10' may be operated at normal conditions.

An objective of the present invention is to mix and heat hydrogen and air in the fuel cell assembly 10' to facilitate catalytic combustion inside the fuel cell assembly 10' during a starting operation to rapidly heat the fuel cell assembly 10' and to militate against vapor condensation and ice formation in the fuel cell assembly 10'.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fuel cell assembly comprising:
   a fuel cell stack including a plurality of fuel cell plates, each of the plates including a cathode side, wherein each cathode side includes a plurality of flow channels, a mixing region in fluid communication with the flow channels and positioned on the cathode side between the flow channels and at least two apertures formed therein, the apertures of the cathode side substantially aligned to form a first manifold in fluid communication with the mixing region and a second manifold in fluid communication with the mixing region, wherein a first fluid flowing through the first manifold is mixed with the second fluid flowing through the second manifold in the mixing region; and
   a means for heating the first fluid and the second fluid, wherein the heated fluids are caused to flow through the flow channels to heat said fuel cell stack to militate against vapor condensation and ice formation in said fuel cell stack.

2. The fuel cell assembly of claim 1, wherein the first manifold and the second manifold are lined with a porous, non-electrically conductive, flame arresting material.

3. The fuel cell assembly of claim 2, wherein the material is one of an aramid fiber, an aramid fabric, a fiberglass, a ceramic, and a treated organic fiber.

4. The fuel cell assembly of claim 1, wherein the first manifold and the second manifold have a geometry that is smaller than a flame quench diameter.

5. The fuel cell assembly of claim 1, wherein the fuel cell plates further include a third aperture and the third apertures of the fuel cell plates are substantially aligned to form a third manifold in fluid communication with the mixing region and the first fluid.

6. The fuel cell assembly of claim 1, further comprising a valve in fluid communication with said fuel cell stack.

7. The fuel cell assembly of claim 6, wherein said valve is adapted to cause a third fluid to flow through said fuel cell stack and purge the first fluid and the second fluid from said fuel cell stack.

8. The fuel cell assembly of claim 6, wherein said valve is in fluid communication with the first manifold and is adapted to purge the first fluid from the first manifold prior to the first fluid flowing through said fuel cell stack.

9. The fuel cell assembly of claim 1, wherein the first fluid flows through the first manifold, the second fluid flows through the second manifold, the first fluid and the second fluid are mixed in the mixing region and heated in a catalytic reaction, and the heated fluids are caused to flow through the flow channels of the fuel cell plates.

10. The fuel cell assembly of claim 1, wherein said means for heating is a catalyzed surface, wherein the catalyzed surface facilitates catalytic combustion of the first fluid and the second fluid.

11. The fuel cell assembly of claim 10, wherein the catalyst of said catalyzed surface is one of platinum, palladium, and cerium.

12. The fuel cell assembly of claim 1, wherein the means for heating is an electrical heater in thermal communication with the mixing region.

13. The fuel cell assembly of claim 1, further comprising a pump in fluid communication with said fuel cell stack.

14. The fuel cell assembly of claim 1, further comprising a shim formed adjacent to the apertures, wherein said means for heating is formed on said shim.

15. The fuel cell assembly of claim 1, wherein the first fluid is a gas and the second fluid is a gas.

16. The fuel cell assembly of claim 6, wherein said valve is adapted to cause the first fluid to flow through the first manifold at a velocity exceeding a maximum flame speed of the first fluid.

17. The fuel cell assembly of claim 6, wherein said valve is adapted to switch from a flow of one of the first fluid and the second fluid to a flow of a purge gas.

18. The fuel cell assembly of claim 10, wherein said catalyzed surface is formed on the mixing region.

19. A fuel cell assembly comprising:
a fuel cell stack including a plurality of fuel cell plates, wherein each plate includes a cathode side having a plurality of flow channels, at least two apertures formed therein, and a mixing region in fluid communication with the flow channels and formed between the flow channels and the apertures, the apertures of the fuel cell plates substantially aligned to form a first manifold in fluid communication with the mixing region and a second manifold in fluid communication with the mixing region, wherein a first fluid flowing through the first manifold is mixed with the second fluid flowing through the second manifold in the mixing region; and
a means for heating the first fluid and the second fluid, wherein the heated fluids are caused to flow through the flow channels to heat said fuel cell stack to militate against vapor condensation and ice formation in said fuel cell stack.

20. A fuel cell assembly comprising:
a fuel cell stack including a plurality of fuel cell plates, wherein each plate includes a cathode side having a plurality of flow channels, at least two apertures formed therein, and a mixing region in fluid communication with the flow channels and formed between the flow channels and the apertures, the apertures of the fuel cell plates substantially aligned to form a first manifold in fluid communication with the mixing region and a second manifold in fluid communication with the mixing region, wherein a first fluid flowing through the first manifold is mixed with the second fluid flowing through the second manifold in the mixing region; and
a catalyzed surface formed on the mixing region for heating the first fluid and the second fluid, wherein the heated fluids are caused to flow through the flow channels to heat said fuel cell stack to militate against vapor condensation and ice formation in said fuel cell stack.

* * * * *